(12) United States Patent
Matsuda et al.

(10) Patent No.: US 10,183,752 B2
(45) Date of Patent: Jan. 22, 2019

(54) VEHICLE SEAT

(71) Applicant: Panasonic Intellectual Property Management Co., Ltd., Osaka (JP)

(72) Inventors: Goichi Matsuda, Osaka (JP); Kaname Tomita, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 138 days.

(21) Appl. No.: 15/267,138

(22) Filed: Sep. 15, 2016

(65) Prior Publication Data
US 2017/0088269 A1 Mar. 30, 2017

(30) Foreign Application Priority Data

Sep. 30, 2015 (JP) ................................. 2015-193234

(51) Int. Cl.
*B64D 11/06* (2006.01)
*B60N 3/00* (2006.01)
*B64D 11/00* (2006.01)

(52) U.S. Cl.
CPC .......... *B64D 11/0638* (2014.12); *B60N 3/004* (2013.01); *B64D 11/0015* (2013.01); *B64D 11/0624* (2014.12); *H01R 2201/26* (2013.01)

(58) Field of Classification Search
CPC ............ B64D 11/0015; B64D 11/0624; B64D 11/0627; B64D 11/0638; B60N 3/004; H01R 2201/26
USPC ........................................................ 439/34
See application file for complete search history.

(56) References Cited

U.S. PATENT DOCUMENTS

| | | | |
|---|---|---|---|
| 6,170,909 B1 | 1/2001 | Inoue | |
| 2003/0179545 A1* | 9/2003 | Falk | B64D 11/0015 361/679.4 |
| 2006/0075934 A1* | 4/2006 | Ram | B60N 3/004 108/44 |
| 2007/0019072 A1* | 1/2007 | Bengtsson | B64D 11/0015 348/148 |
| 2014/0319867 A1* | 10/2014 | Von Rothkirch und Panthen | B60N 3/002 296/24.34 |
| 2015/0244127 A1* | 8/2015 | Kim | B60N 3/14 439/34 |
| 2017/0021931 A1* | 1/2017 | Stephens | B64D 11/0638 |
| 2017/0313258 A1* | 11/2017 | Argyle | B60R 11/02 |

FOREIGN PATENT DOCUMENTS

| | | | | |
|---|---|---|---|---|
| DE | 102005015238 A1 * | 10/2006 | | B60N 2/0228 |
| EP | 0577054 A1 * | 1/1994 | | A63F 13/08 |
| EP | 1010573 A2 * | 6/2000 | | B60N 2/206 |

(Continued)

*Primary Examiner* — Ryan D Kwiecinski
(74) *Attorney, Agent, or Firm* — McDermott Will & Emery LLP

(57) ABSTRACT

The vehicle seat of the present disclosure has a base unit, a tray, and a connection terminal. The base unit is disposed on a rear side of the backrest and has a storage section. The tray has a through-hole or a notch which a connection device of a predetermined size passes and is disposed so as to be movable between a storage position located in the storage section of the base unit and an open position of the tray unfolded from the storage position. The connection terminal that is disposed on the base unit at a position that meets with the through-hole or the notch of the tray located at the storage position.

20 Claims, 13 Drawing Sheets

(56) References Cited

FOREIGN PATENT DOCUMENTS

| | | |
|---|---|---|
| JP | 2000-052831 | 2/2000 |
| JP | 2013-506596 | 2/2013 |
| WO | 1999/014655 | 3/1999 |
| WO | 2011/041760 | 4/2011 |

\* cited by examiner

VEHICLE SEAT

BACKGROUND

1. Field

The present disclosure relates to a vehicle seat whose backrest has a retractable tray on the rear side.

2. Description of the Related Art

A passenger seat having a display on the backrest is disclosed in Patent Literature 1. The display has a card-reader slot disposed close to the screen. With the structure above, a passenger can pay by card by inserting his/her credit card into the card-reader slot.

CITATION LIST

Patent Literature

PTL 1: WO99/14655

SUMMARY

The present disclosure provides a vehicle seat that offers effective use of a space of the backrest on the rear side.

The vehicle seat of the present disclosure has a base unit, a tray, and a connection terminal. The base unit is disposed on a rear side of a backrest and has a storage section. The tray has a through-hole or a notch which a connection device of a predetermined size passes and is disposed so as to be movable between a storage position located in the storage section of the base unit and an open position of the tray unfolded from the storage position. The connection terminal that is disposed on the base unit at a position that meets with the through-hole or the notch of the tray located at the storage position.

In the case where the connection terminal communicates wirelessly with a wireless communication device, the tray has a through-hole, a notch, or a thin-walled part formed of nonmetallic material.

The vehicle seat of the present disclosure offers effective use of a space on the rear side of the backrest.

DETAILED DESCRIPTION

Hereinafter, an exemplary embodiment will be described in detail, with reference to the accompanying drawings. However, details beyond necessity (for example, descriptions on well-known matters or on substantially identical structures) may be omitted to eliminate redundancy from the description below for easy understanding of those skilled in the art.

It is to be understood that the accompanying drawings and the description below are for purposes of full understanding of those skilled in the art and are not to be construed as limitation on the scope of the claimed disclosure.

First Exemplary Embodiment

Seat 1 of the first exemplary embodiment will be described with reference to FIG. 1 through FIG. 9B.

[1-1. Structure]

[1-1-1. General Structure]

Figure 1:
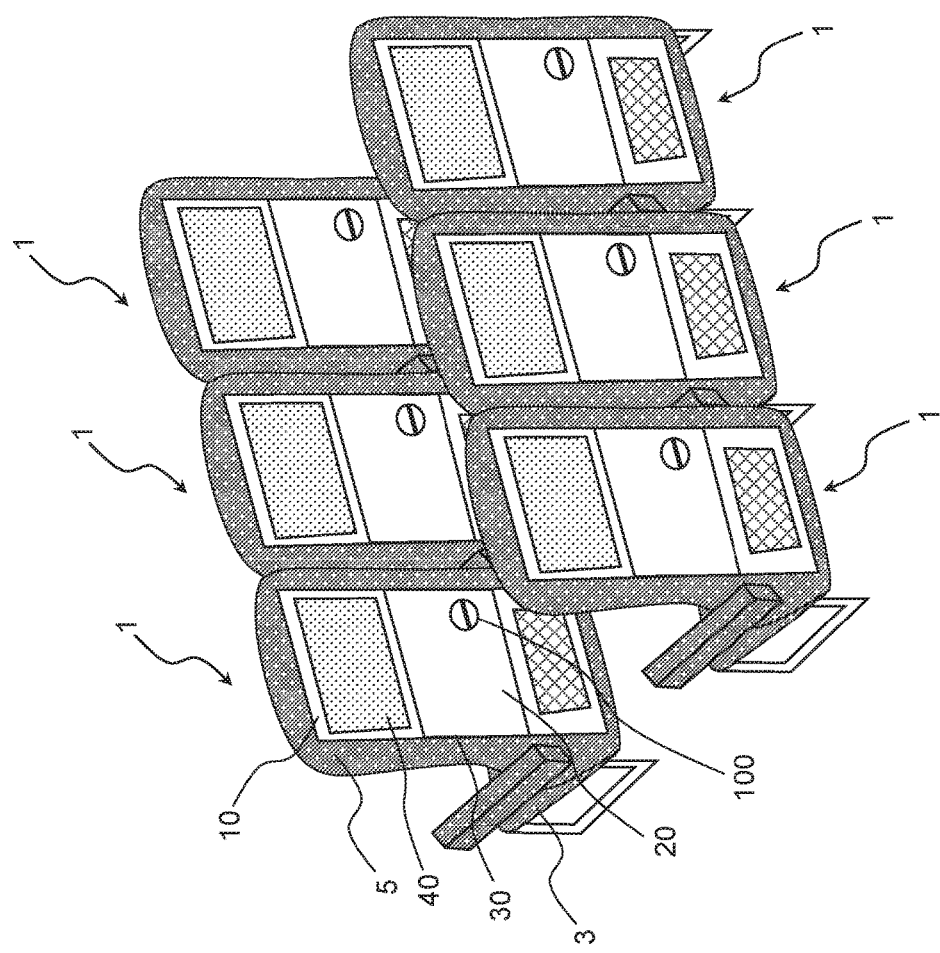
FIG. 1 is a schematic view of a plurality of seats having a monitor and a tray arranged in the cabin of an airplane in accordance with a first exemplary embodiment.
Figure 2:
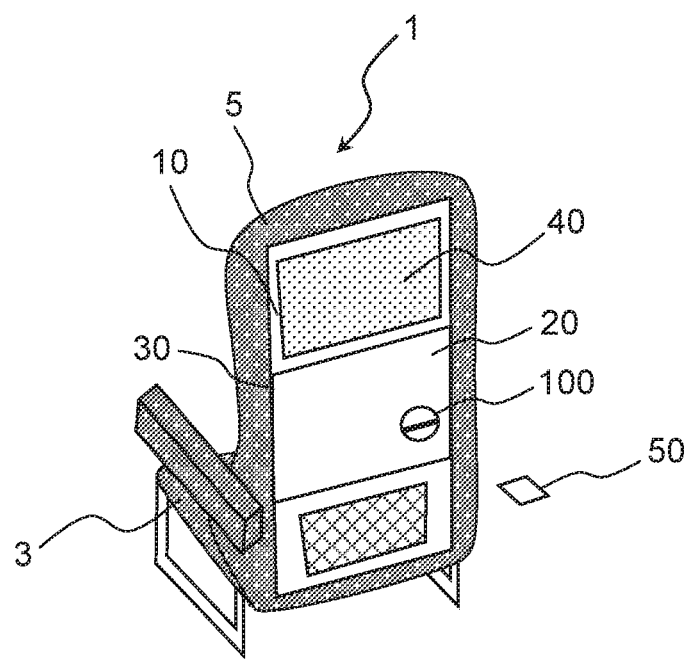
FIG. 2 is a schematic view of a seat arranged in the cabin of an airplane in accordance with the first exemplary embodiment.

FIG. 1 shows a plurality of seats 1 of the embodiment arranged in the cabin of an airplane. FIG. 2 schematically shows seat 1. Seat 1 has seat face 3, backrest 5, base unit 10, tray 20, monitor 40, and payment terminal 100. As shown in FIG. 2, when card 50 is inserted into payment terminal 100, it reads data stored in card 50. Base unit 10 is disposed on the rear side of backrest 5 of seat 1. Monitor 40 and tray 20 are also disposed on backrest 5 of seat 1. Base unit 10 is a member on which monitor 40, tray 20, and payment terminal 100 are mounted. Base unit 10 has storage section 30 for retaining tray 20. Seat 1 is an example of vehicle seats, payment terminal 100 is an example of connection terminals, and card 50 is an example of connection devices.

[1-1-2. Tray 20]

Figure 3:
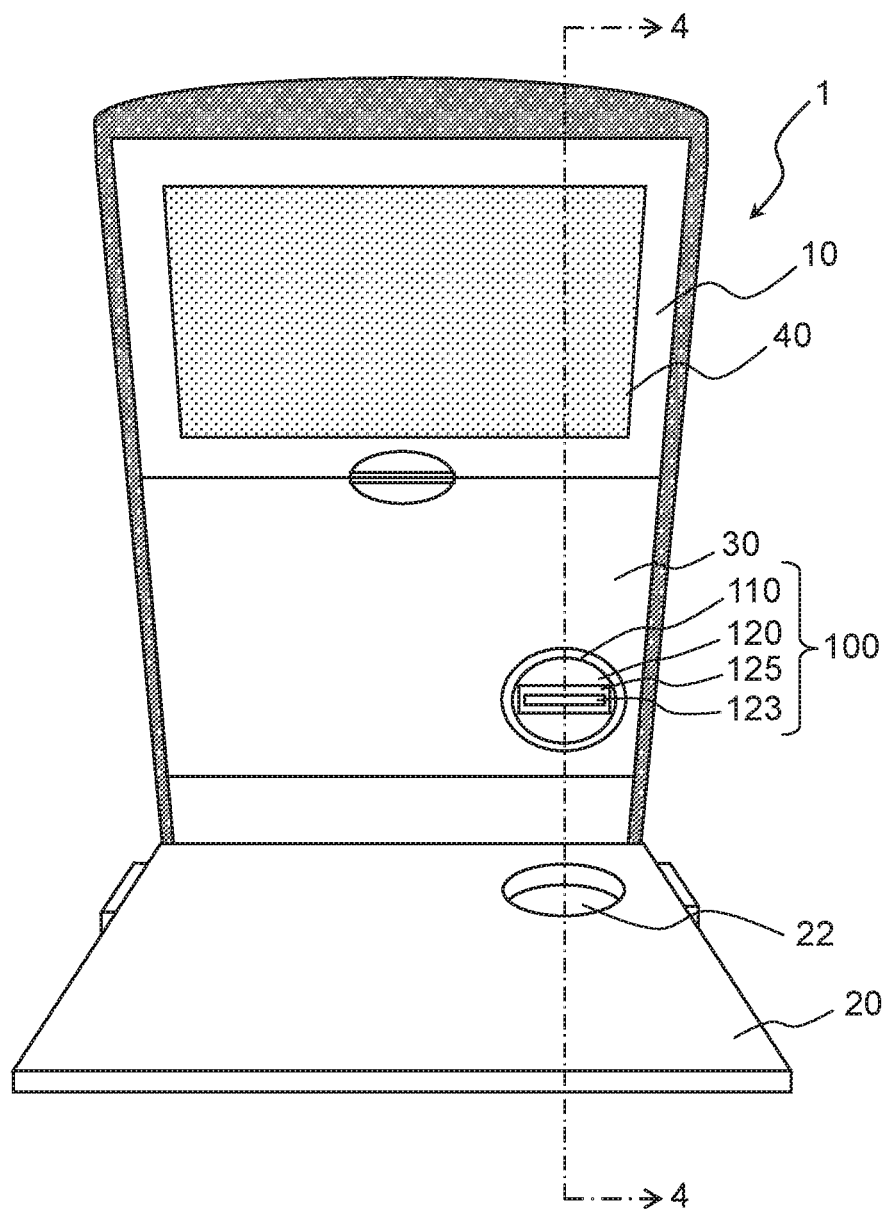
FIG. 3 is a schematic view of the seat with the tray opened in accordance with the first exemplary embodiment.
Figure 4:
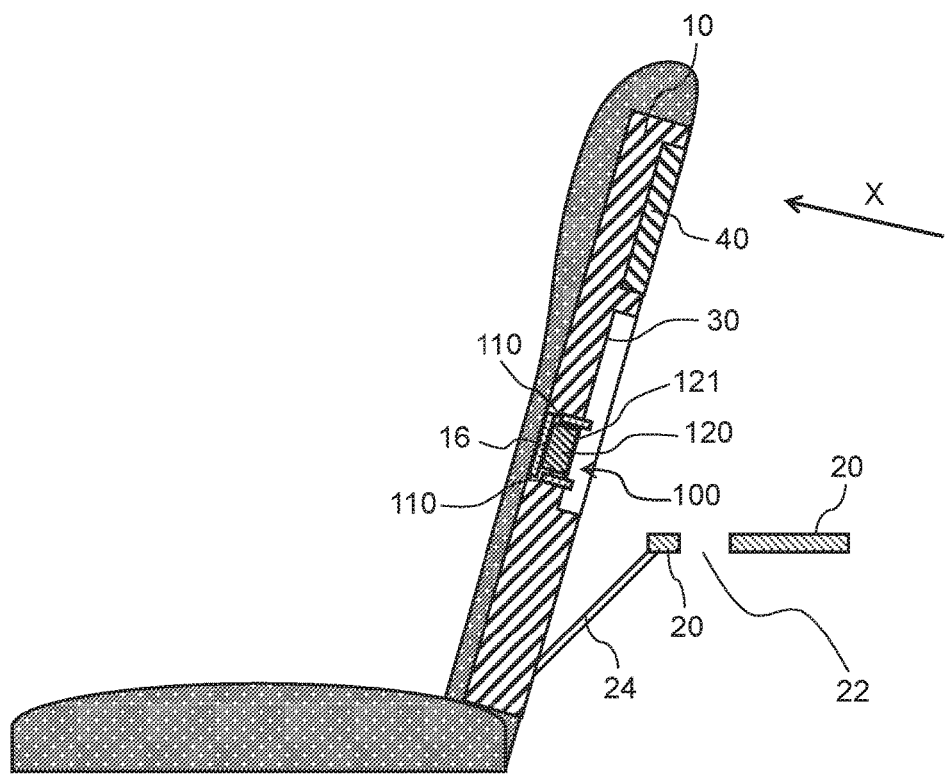
FIG. 4 is a sectional view of the seat with the tray opened in accordance with the first exemplary embodiment.

Tray 20 is disposed on seat 1 so as to be movable between the storage position and the open position. FIG. 3 is an enlarged view of seat 1 with tray 20 opened. FIG. 4 shows an axial cross section of payment terminal 100 of seat 1 (where the horizontal direction of seat 1 is the normal direction). The X direction shown in FIG. 4 represents the front-back direction of seat 1. In the description, the forward direction with respect to seat 1 is referred to the X-plus direction, whereas the backward direction with respect to seat 1 is referred to the X-minus direction. The open state of tray 20 is the condition where tray 20 is unfolded horizontally, being held by tray support member 24; the position of tray 20 at that time is the open position.

Storage section 30 is the place to which tray 20 is fixed when it is retracted to the storage position (which will be described below). Preferably, storage section 30 should be shaped into a recess nearly the same as that of tray 20. When tray 20 is retracted into storage section 30 of a recessed shape, the lower face of tray 20 that is exposed to the outside is almost flush with the surface of base unit 10. Such formed storage section 30 is aesthetically preferable, but it is not limited to; storage section 30 may have a recess that fits with a part of tray 20 when tray 20 is placed at the storage position, or storage section 30 may have no recess. That is, storage section 30 does not necessarily have a recess as long as it securely retains tray 20 at the storage position.

Payment terminal 100 is disposed in storage section 30. Base unit 10 has mounting base 16 in storage section 30. Payment terminal 100 is mounted on mounting base 16. Payment terminal 100, which will be described in detail later, has cylindrical member 110 and main unit 120. Main unit 120 has card reader 125 with card slot 123. According to the embodiment, card 50 has a size that fits through card slot 123 and contains an IC chip.

When card 50 is inserted into card slot 123, card reader 125 of payment terminal 100 reads data stored in the IC chip. Cylindrical member 110 is an example of an outer frame, and main unit 120 is an example of the main unit of a connection terminal.

In the open state of tray 20, as shown in FIG. 4, cylindrical member 110 of payment terminal 100 protrudes in the X-minus direction beyond exposed face 121 of main unit 120 that is exposed toward the X-minus direction; and at the same time, exposed face 121 of main unit 120 is located on the side of the X-plus direction beyond the surface of base unit 10. Card reader 125 and card slot 123 are omitted in FIG. 4.

Tray 20 has through-hole 22 that goes through in up-down direction. Through-hole 22 is a round hole, and when tray 20 is in the open state, the hole retains a cup of a predetermined size used in the cabin of an airplane. That is, through-hole 22 serves as a cup holder. Through-hole 22 has a size that card 50 passes through.

Figure 5:
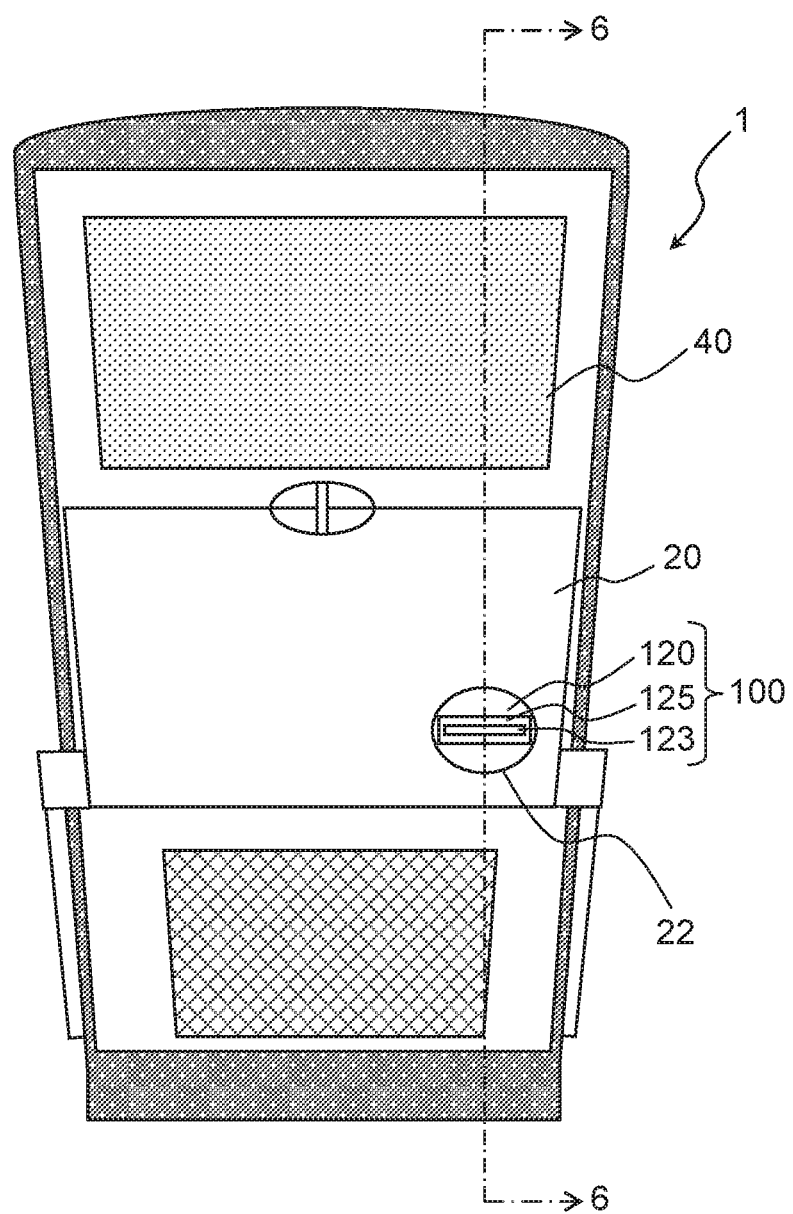
FIG. 5 is a schematic view of the seat with the tray retracted in accordance with the first exemplary embodiment.
Figure 6:
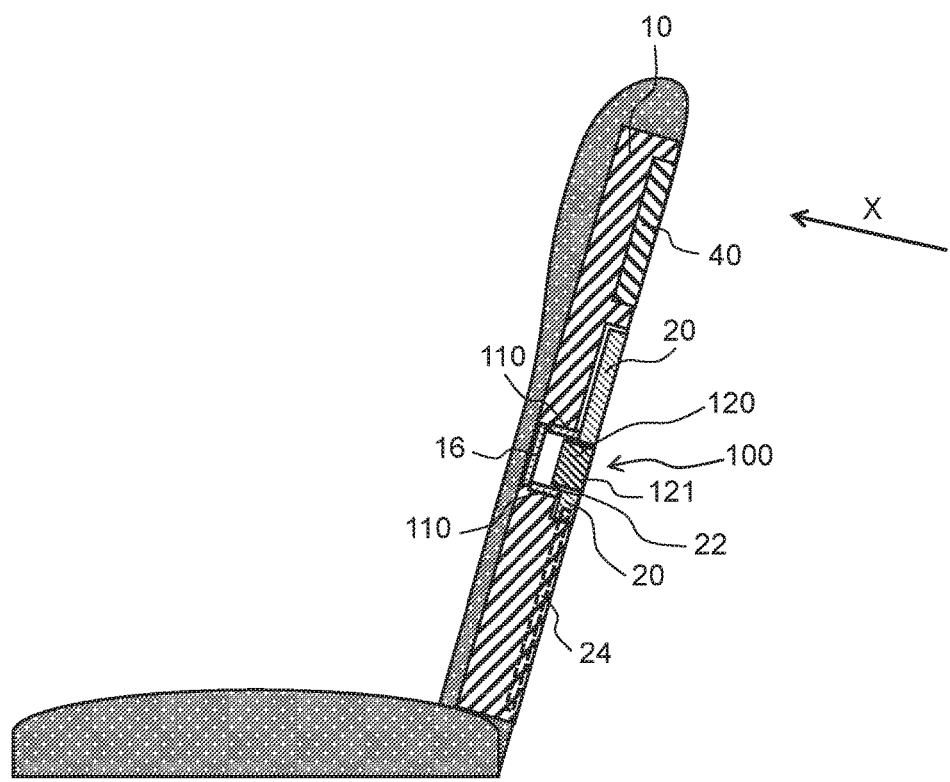
FIG. 6 is a sectional view of the seat with the tray retracted in accordance with the first exemplary embodiment.

FIG. 5 is an enlarged view of seat 1 with tray 20 retracted. FIG. 6 shows an axial cross section of payment terminal 100 of seat 1 (where the horizontal direction of seat 1 is the normal direction). Tray 20 in the closed state is specifically in the following condition. When tray 20 is rotationally moved—from the open state where tray 20 is horizontally unfolded—upward to the position at which it becomes nearly parallel to tray support member 24, the tray 20 is placed in storage section 30 such that the upper face (or the lower face) of tray 20 faces the rear face of backrest 5 in nearly parallel. When tray 20 is placed as mentioned above, the state is referred to the closed state of tray 20, and the position to which tray 20 is retracted in storage section 30 is referred to the storage position.

When tray 20 is at the storage position, through-hole 22—seen along the X direction—is located at a place that entirely overlaps with card slot 123 of payment terminal 100. That is, when tray 20 is at the storage position, the entire structure of card slot 123 of payment terminal 100 can be seen via through-hole 22 in the X direction. Mounting base 16 is disposed on base unit 10 so as to meet with through-hole 22 of tray 20 located at the storage position.

Mounting payment terminal 100 onto mounting base 16 allows a passenger to insert card 50, via through-hole 22, into card slot 123 of payment terminal 100 when tray 20 is at the storage position.

The inner diameter of through-hole 22 is, as shown in FIG. 5 and FIG. 6, smaller than the outer diameter of cylindrical member 110. This allows cylindrical member 110 to be pushed toward the X-plus direction by tray 20 placed at the storage position. Main unit 120 of payment terminal 100 is moved in the X-minus direction by the pop-up mechanism, which will be described later. At that time, exposed face 121 of main unit 120 moves to a position where is nearly flush with the lower face of tray 20. In addition to the structure above, a protrusion that protrudes from the upper face of tray 20 may be disposed on the outer periphery of through-hole 22 so that the upper face of tray 20 pushes cylindrical member 110 without fail. FIG. 6 does not show card reader 125 and card slot 123.

[1-1-3. Payment Terminal 100]

Payment terminal 100 has a pop-up mechanism. With the movement of tray 20 toward the storage position, the pop-up mechanism makes card reader 125 of main unit 120 move in a direction in which it protrudes from base unit 10 inside through-hole 22 of tray 20.

Figure 7:
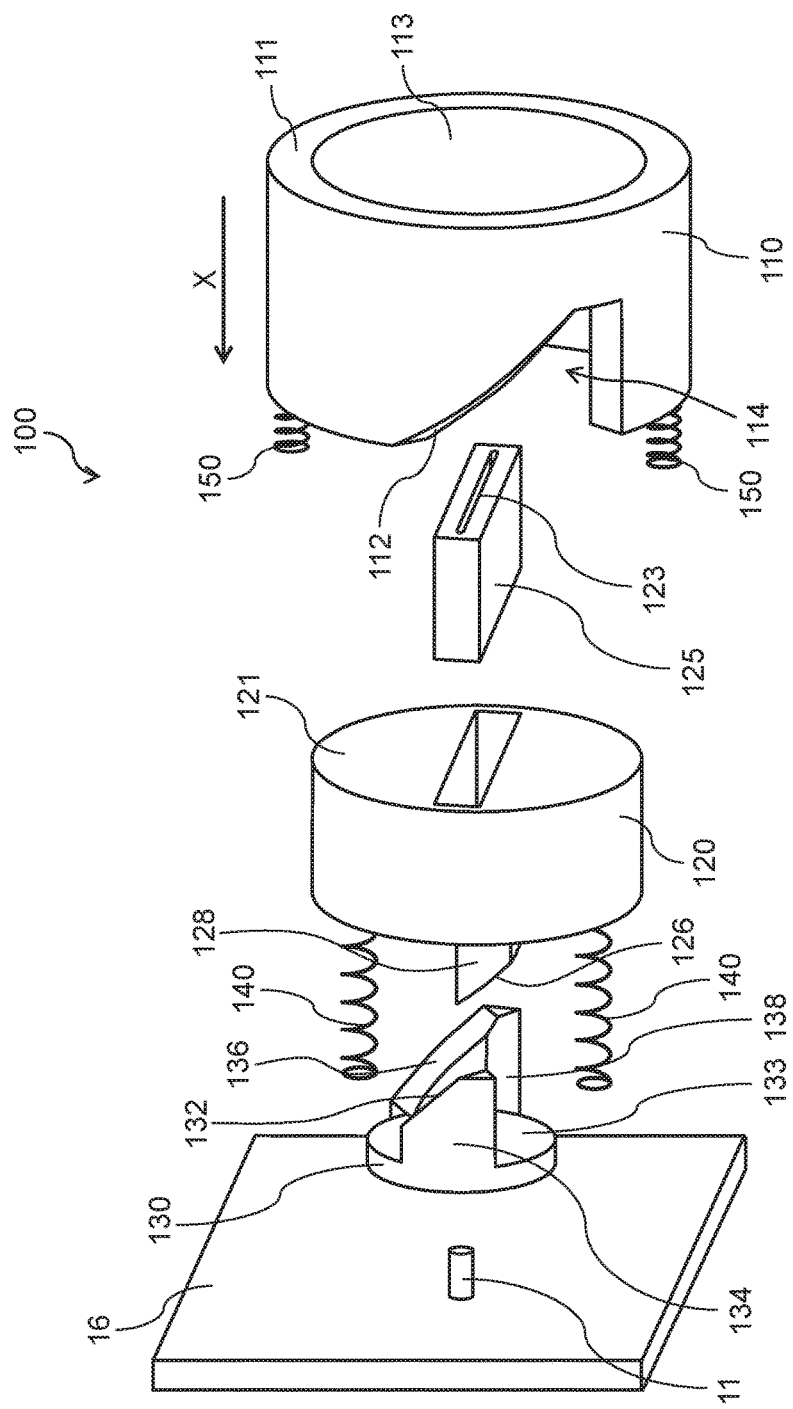
FIG. 7 is an exploded perspective view of a pop-up mechanism of a payment terminal in accordance with the first exemplary embodiment.

FIG. 7 is an exploded perspective view of the pop-up mechanism of payment terminal 100. Payment terminal 100 has cylindrical member 110, main unit 120, rotatable member 130, twin springs 140, and twin springs 150.

Cylindrical member 110 is substantially shaped into a cylinder and is disposed so that the center line of the cylinder is parallel to the X direction. Cylindrical member 110 is movable in the X direction at least between a first position and a second position located in the X-plus direction beyond the first position. The first position and the second position will be explained later in the description of workings. Cylindrical member 110 has contact face 111, notch 114, cam face 112, and through-hole 113.

Contact face 111 is the bottom of the cylinder on the side of the X-minus direction. The outer diameter of contact face 111 is larger than the inner diameter of through-hole 22 of tray 20, which allows at least a part of contact face 111 to make a contact with the upper face of tray 20 when tray 20 is placed at the storage position or in the proximity of the storage position. When contact face 111 of cylindrical member 110 makes a contact with tray 20, tray 20 pushes cylindrical member 110 in the X-plus direction, by which cylindrical member 110 moves in the X-plus direction. Notch 114 is so formed that the side face of the cylinder is partially cut from the bottom side in the X-plus direction of the cylinder so as to have a notch spiral with respect to the X direction (or with respect to the bus line of the cylinder). Cam face 112 of notch 114 is a cut-out face at an angle with respect to the X direction. Cam face 112 is disposed on the side of the X-plus direction, as shown in FIG. 7, and it faces obliquely downward. Through-hole 113 has an inner diameter slightly larger than the outer shape of main unit 120. Main unit 120 is disposed inside through-hole 113.

Main unit 120, which is substantially formed into a cylinder, is disposed so that the center line of the cylinder is parallel to the X direction. Main unit 120 is movable in the X direction at least between a fifth position and a sixth position located in the X-minus direction beyond the fifth position. The fifth position and the sixth position will be explained later in the description of workings. Main unit 120 has exposed face 121, card reader 125, and cam 128. Exposed face 121 is the bottom of the cylinder on the side of the X-minus direction. Main unit 120 has an outer diameter smaller than the inner diameter of through-hole 22 of tray 20. This allows main unit 120 to enter into through-hole 22 of tray 20 when tray 20 is placed at the storage position or in the proximity of the storage position.

Card reader 125 is inserted from exposed face 121 into a mounting hole formed on the side of the X-plus direction. Card reader 125 has card slot 123 in which card 50 is inserted. Card 50 is inserted into card slot 123 in the X-plus direction. When card 50 is inserted into card slot 123, card reader 125 obtains data stored in card 50 by contact-type reading. Cam 128 protrudes from main unit 120 toward the X-plus direction. Cam 128 has cam face 126. Cam face 126 is formed on the edge of cam 128 in the X-plus direction. Cam face 126 faces obliquely downward with respect to the X direction.

Rotatable member 130 has base member 133, cam 134, and cam 138. Base member 133, which is formed into a disc, i.e., a low-profile cylinder, is disposed so that the center line thereof is parallel to the X direction. Cam 134 is disposed on the outer periphery on the side of the X-minus direction of base member 133 so as to protrude toward the X-minus direction. Cam 134 has cam face 132. Cam face 132 is formed on the edge of cam 134 in the X-minus direction. Cam face 132 is, as shown in FIG. 7, formed on the side of the X-minus direction and faces obliquely upward. Cam face 132 makes a contact with cam face 112 of cylindrical member 110. Cam 138 protrudes from the outer periphery of base member 133 toward the X-minus direction. Cam 138 has cam face 136. Cam face 136 is formed on the edge of cam 138 in the X-minus direction. Cam face 136 is, as shown in FIG. 7, formed on the side of the X-minus direction and faces obliquely upward. Cam face 136 makes a contact with cam face 126 of main unit 120. Cam 134 is connected to cam 138 via base member 133.

Figure 8A:
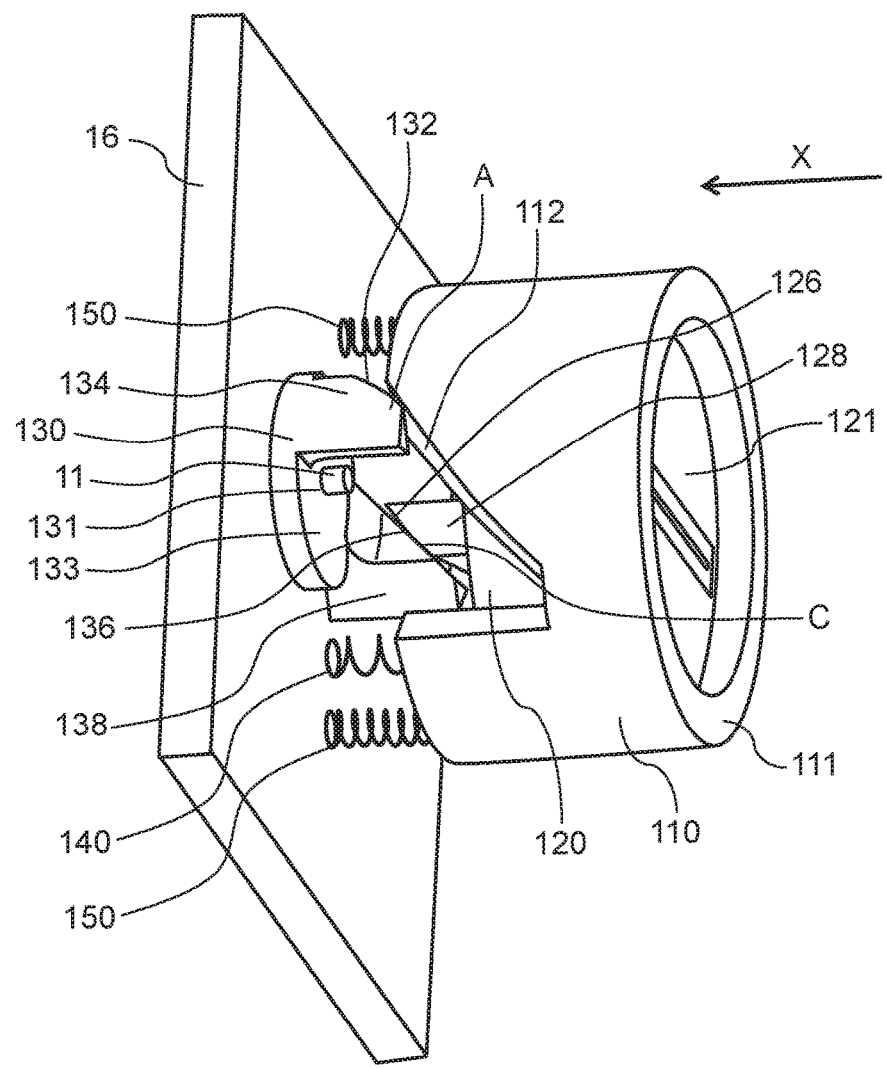
FIG. 8A is a perspective view of the pop-up mechanism with the tray opened in accordance with the first exemplary embodiment.

Base member 133 has through-hole 131, as shown in FIG. 8A, which goes through the center part of base member 133 in the X direction. Cam 134 and cam 138 are oppositely disposed across through-hole 131. Shaft member 11 fixed to mounting base 16 is inserted into through-hole 131. Shaft member 11, which protrudes from mounting base 16 toward the X-minus direction, serves as the shaft of rotatable member 130. Rotatable member 130 rotates on shaft member 11. Rotatable member 130 can rotate at least between a third position and a fourth position. The fourth position—seen from the side of the X-minus direction of rotatable member 130—is the position rotated counterclockwise by a predetermined angle from the third position. The third position and the fourth position will be explained later in the description of workings. Hereinafter, the rotation direction of rotatable member 130 will be described on the premise that rotatable member 130 is seen from the side of the X-minus direction.

Twin springs 140 are connected between mounting base 16 and main unit 120 such that they are pulled longer than the natural length. The resilient force of springs 140 pulls main unit 120 in the X-plus direction, by which cam face 126 of main unit 120 maintains a contact with cam face 136 of rotatable member 130. The movement range in the X-plus direction of main unit 120 is limited by a control member (not shown) so that main unit 120 cannot go farther beyond the fifth position.

In contrast, twin springs 150 are connected between mounting base 16 and cylindrical member 110 such that they are pressed shorter than the natural length. The resilient force of springs 150 pushes cylindrical member 110 in the X-minus direction. The movement range in the X-minus direction of cylindrical member 110 is limited by a control member (not shown) so that cylindrical member 110 cannot go farther beyond the first position. Springs 150 have a spring constant smaller than that of springs 140.

[1-2. Workings]

[1-2-1. Open State]

Figure 8B:
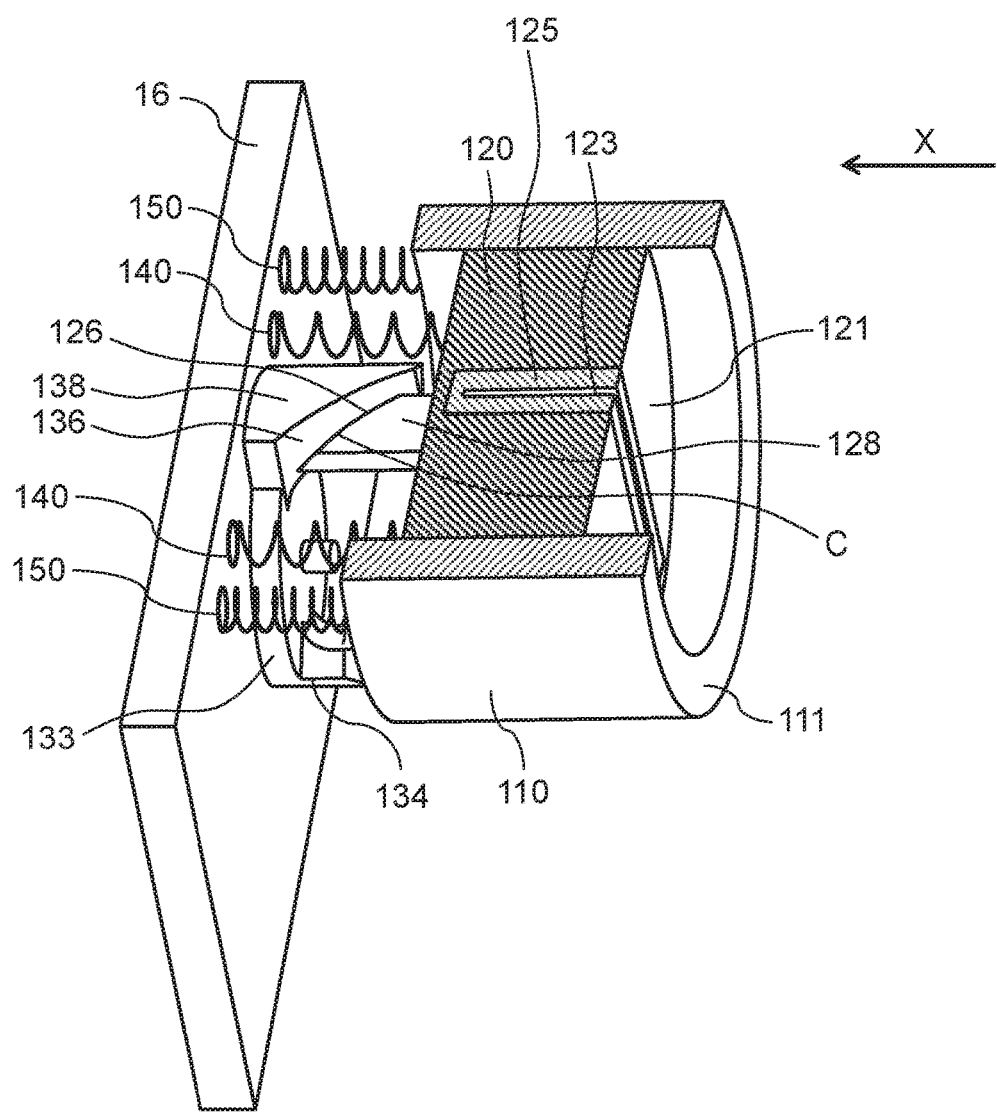
FIG. 8B is a perspective view of the pop-up mechanism with the tray opened in accordance with the first exemplary embodiment.

FIG. 8A is a perspective view of the pop-up mechanism of payment terminal 100 when tray 20 is in the open state. FIG. 8B is a perspective view of the pop-up mechanism of payment terminal 100, seen from a direction different from that of FIG. 8A, when tray 20 is in the open state. For convenience sake, in FIG. 8B, a part of payment terminal 100 (the front side in FIG. 8B) is cut out so that the interior is easily seen.

In FIG. 8A and FIG. 8B, springs 140 pull main unit 120 in the X-plus direction, by which cam face 126 of main unit 120 makes contact with cam face 136 of rotatable member 130 at position C. Under the condition, main unit 120 is retained at the fifth position. Pressing force of cam face 126 onto cam face 136 allows rotatable member 130 to be rotated clockwise and retained at the third position. Cam face 112 of cylindrical member 110 makes contact at position A with cam face 132 of rotatable member 130 retained at the third position. As a result, cylindrical member 110 is retained at the first position.

In the state above, twin springs 150 pushes cylindrical member 110 in the X-minus direction. Resilient force of springs 150 allows cam face 112 to push cam face 132, generating rotational force counterclockwise onto rotatable member 130. As described earlier, twin springs 150 have a spring constant smaller than that of twin springs 140; accordingly, the counterclockwise force by springs 150 exerted on rotatable member 130 is smaller than the clockwise force by springs 140 exerted on it. That is, the resultant force of springs 140 and springs 150 rotates rotatable member 130 clockwise, i.e., rotates it from the fourth position toward the third position. As a result, rotatable member 130 is retained at the third position at which cam face 132 makes contact with cam face 112.

As described above, in the state where payment terminal 100 is subjected to no external force, main unit 120 is placed at the fifth position; rotatable member 130 is placed at the third position; and cylindrical member 110 is placed at the first position. At that time, as shown in FIG. 4, exposed face 121 of main unit 120 is almost flush with the surface of storage section 30. As shown in FIG. 8A and FIG. 8B, contact face 111 of cylindrical member 110 protrudes in the X-minus direction beyond exposed face 121 of main unit 120.

When tray 20 is in the open state, i.e., tray 20 is placed at the unfolded position, the position of card slot 123 of card reader 125 disposed on main unit 120 of payment terminal 100 is nearly flush with the surface of storage section 30 of base unit 10. The structure above allows passengers to easily insert card 50 into card slot 123 when tray 20 is placed at the unfolded position.

[1-2-2. Workings for Changing Tray 20 into Closed State]

The description below is on the workings of the pop-up mechanism of payment terminal 100 when tray 20 changes the state from the open state to the closed state by moving from the unfolded position to the storage position. In the transition period of tray 20 between the open state and the closed state, the pop-up mechanism moves main unit 120 as described below. In the transitional movement of tray 20 from the unfolded position to the storage position, on a certain position at which tray 20 has come close to the storage position, the upper face of tray 20 makes contact with contact face 111 of cylindrical member 110 placed at the first position—the position of tray 20 at that time is referred to the contact position. When tray 20 further moves beyond the contact position toward the storage position, the upper face of tray 20 pushes and moves cylindrical member 110 in the X-plus direction.

While tray 20 moves to the storage position and reaches storage section 30, cylindrical member 110 is pushed in the X-plus direction from the first position to the second position. In the moving process of cylindrical member 110 in the X-plus direction, cam face 112 of cylindrical member 110 pushes cam face 132 of rotatable member 130. The movement of cam face 112 and cam face 132 allows rotatable member 130 to have a rotational force counterclockwise on shaft member 11. With the movement of cylindrical member 110 from the first position to the second position, rotatable member 130 rotationally moves from the third position to the fourth position. In the counterclockwise rotational movement of rotatable member 130, cam face 136 of rotatable member 130 pushes cam face 126 of main unit 120 in the X-minus direction. The movement of cam face 136 and cam face 126 allows main unit 120 to be pushed and moved in the X-minus direction. In this way, with the counterclockwise rotational movement of rotatable member 130 from the third position to the fourth position, main unit 120 moves from the fifth position to the sixth position in the X-minus direction.

As described above, when tray 20 moves in the X-plus direction from the contact position to the storage position, main unit 120 moves in the X-minus direction from the fifth position to the sixth position with the movement of cylindrical member 110 of payment terminal 100 from the first position to the second position in the X-plus direction. In the movement process above, exposed face 121 of main unit 120 protruding in the X-minus direction beyond contact face 111 of cylindrical member 110 and a part of the side face continuous with exposed face 121 of main unit 120 enter into through-hole 22 of tray 20.

[1-2-3. Closed State]

Figure 9A:
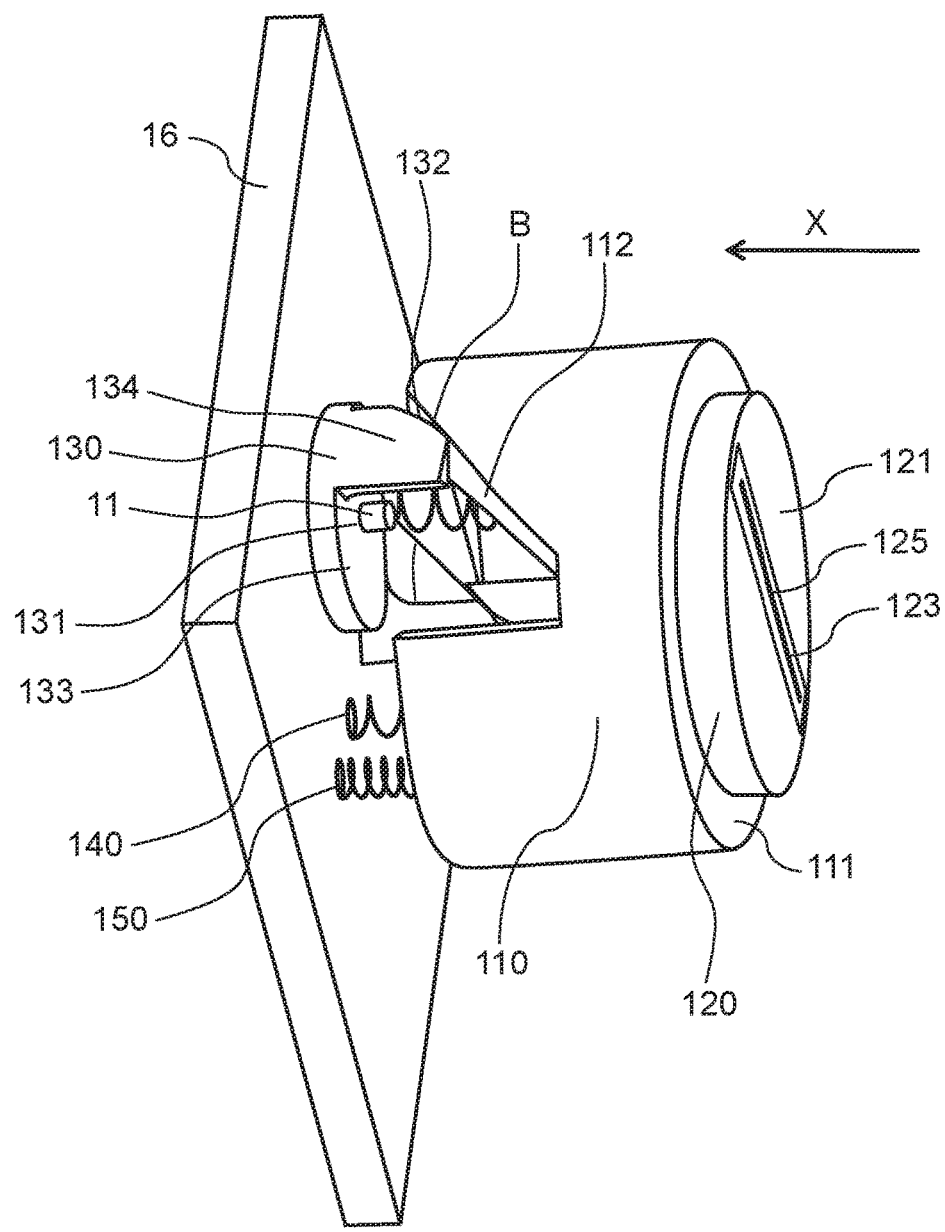
FIG. 9A is a perspective view of the pop-up mechanism with the tray retracted in accordance with the first exemplary embodiment.
Figure 9B:
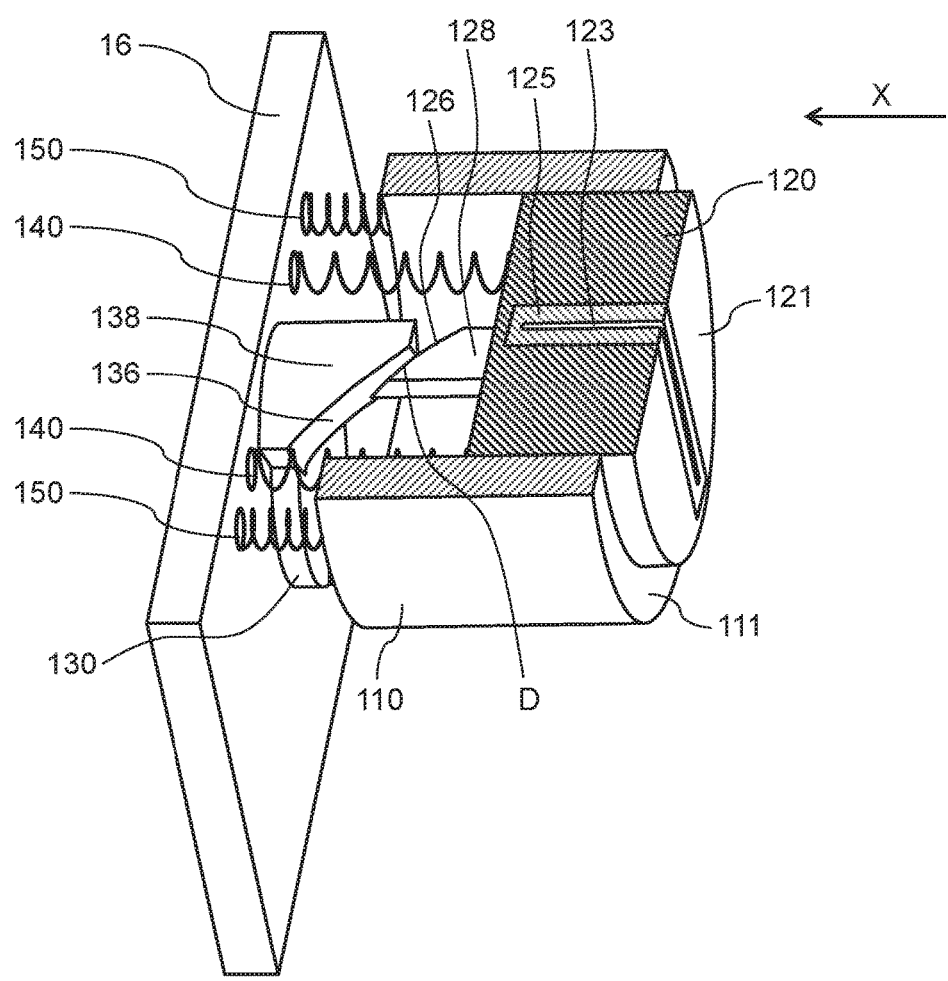
FIG. 9B is a perspective view of the pop-up mechanism with the tray retracted in accordance with the first exemplary embodiment.

FIG. 9A is a perspective view of the pop-up mechanism of payment terminal 100 when tray 20 is in the closed state. FIG. 9B is a perspective view of the pop-up mechanism of payment terminal 100, seen from a direction different from that of FIG. 9A, when tray 20 is in the closed state. For convenience sake, in FIG. 9B, a part of payment terminal 100 (the front side in FIG. 9B) is cut out so that the interior is easily seen.

In the closed state shown in FIG. 9A and FIG. 9B, contact face 111 of cylindrical member 110 makes contact with the upper face of tray 20 located in the storage position, which allows cylindrical member 110 to retain at the second position. Further, cam face 132 of rotatable member 130 makes contact at position B with cam face 112 of cylindrical member 110 retained on the second position. This allows rotatable member 130 to be retained on the fourth position against the resultant force of springs 140 and springs 150. Further, cam face 126 of main unit 120 makes contact at position D with cam face 136 of rotatable member 130 retained on the fourth position. This allows main unit 120 to be retained on the sixth position.

That is, in the condition where tray 20 is in the closed state and tray 20 pushes cylindrical member 110 into the second position, main unit 120 and rotatable member 130 of payment terminal 100 are positioned at the sixth position and the fourth position, respectively. At that time, exposed face 121 of main unit 120 protrudes in the X-minus direction beyond contact face 111 of cylindrical member 110. That is, as shown in FIG. 6, exposed face 121 of main unit 120 moves in the X-minus direction to the position at which it becomes nearly flush with the lower face of tray 20 located in the storage position.

As described above, when tray 20 is in the closed state, i.e., it is placed in the storage position, card slot 123 of payment terminal 100 is located at a position the same as that of through-hole 22 of tray 20 on a planar view in the X direction, which allows card 50 to be inserted into card slot 123. Further, the pop-up mechanism moves main unit 120 of payment terminal 100 to the position where card slot 123 of card reader 125 disposed on main unit 120 is nearly flush with the lower face of tray 20. The structure allows passengers to easily insert card 50 into card slot 123 when tray 20 is located in the storage position, like in the open position.

[1-2-4. Workings for Changing Tray 20 into Open State]

The description below is on the workings of the pop-up mechanism of payment terminal 100 when tray 20 changes the state from the closed state to the open state by moving from the storage position to the unfolded position. In the transition period of tray 20 from the closed state to the open state, the pop-up mechanism works in the converse order to the workings for moving the tray to the storage position. The pop-up mechanism changes from the state of FIGS. 9A and 9B to the state of FIGS. 8A and 8B, and therefore, detailed description will be omitted.

[1-3. Effect]

As described above, seat 1 of the embodiment has base unit 10, tray 20, and payment terminal 100. Base unit 10, which is disposed on the rear side of backrest 5, has storage section 30. Tray 20 has through-hole 22 that card 50 of a predetermined size can go through. Tray 20 is movable between the storage position—on which the tray is retracted in storage section 30 of base unit 10—and the open position unfolded from the storage position. Payment terminal 100 is disposed on a position in base unit 10 so as to meet with through-hole 22 of tray 20 placed in the storage position. Payment terminal 100 reads data stored in card 50.

According to the structure of the embodiment, as described above, payment terminal 100 is located at a position the same as that of through-hole 22 of tray 20 on a planar view in the X direction. The structure allows passengers to use payment terminal 100—even when payment terminal 100 is disposed on storage section 30 of tray 20—regardless of the state (open or closed) of tray 20. That is, the structure allows payment terminal 100 to be disposed on base unit 10, making effective use of a space in storage section 30. Therefore, seat 1 of the embodiment offers effective use of a space on the rear side of backrest 5.

Besides, seat 1 of the embodiment has a pop-up mechanism. With the movement of tray 20 toward the storage position, the pop-up mechanism makes card reader 125 of payment terminal 100 go into through-hole 22 of tray 20.

With the retracting movement of tray 20, the pop-up mechanism allows cylindrical member 110 to be pushed by retracting tray 20, so that main unit 120 is pushed to a position that is nearly flush with the lower face of tray 20. That is, when tray 20 is in the open state, exposed face 121 of payment terminal 100 is located on a plane that is almost the same as the surface of storage section 30 of base unit 10 in the X direction. On the other hand, when tray 20 is in the closed state, exposed face 121 of payment terminal 100 is located on a plane that is almost the same as the lower face of tray 20 in the X direction. The structure enables passengers to easily insert card 50 into card slot 123 of exposed face 121, not only in the open state of tray 20 but also in the closed state of it. That is, the structure allows card 50 to be inserted into card slot 123—regardless of the position of tray 20—without hampering user-friendly operation.

Other Exemplary Embodiments

The structure described in the first exemplary embodiment is an example of the technique of the present disclosure. However, the technique of the present disclosure is not limited to the above and also applicable to other structures with modification, replacement, addition, and omission. Further, a new structure can be developed by combining the components described in the first exemplary embodiment. Hereinafter, other exemplary embodiments will be described.

In the first exemplary embodiment, the structure of payment terminal 100 having the pop-up mechanism is described; but payment terminal 100 may not contain the pop-up function. That is, determining the position of card slot 123 of payment terminal 100 so as to meet with that of through-hole 22 enhances effective use of a space of backrest 5. Nevertheless, the structure having the pop-up mechanism is more preferable from the reason that card 50 can be easily inserted into card slot 123 regardless of the state of tray 20.

In the structure of the first exemplary embodiment, mounting base 16 is disposed on base unit 10 at a position that meets with through-hole 22 of tray 20 placed at the storage position, but the position of mounting base 16 is not limited to the above, as long as payment terminal 100 can be fixed to a position where through-hole 22 overlaps with the entire structure of card slot 123 of payment terminal 100 (or where the card slot is entirely visible) when tray 20 placed at the storage position is seen along the X direction.

In the structure of the first exemplary embodiment, shaft member 11 is formed on mounting base 16, but it is not limited to. Other than mounting base 16, payment terminal 100 may contain a base member on which shaft member 11 is disposed. That is, the components forming payment terminal 100 may be disposed on the base member. In that case, payment terminal 100 is attached to base unit 10 by mounting the base member onto mounting base 16. Further, the structure may not have mounting base 16. In that case, payment terminal 100 is directly fixed to storage section 30 of base unit 10.

In the structure of the first exemplary embodiment, tray 20 contains through-hole 22, but it is not limited to; instead of through-hole 22, tray 20 may contain a notch disposed at a place that entirely overlaps with card slot 123 (or at a place from which the entire structure of the card slot can be seen) of payment terminal 100. When having such a notch, the structure is effective as well as that of the first exemplary embodiment. Like through-hole 22, the notch is formed into a shape that can retain a cup of a predetermined size.

In the first exemplary embodiment, card reader 125 of the structure is a contact-type reader that reads data stored in card 50 when card 50 is inserted into card slot 123, but the card reader may be a non-contact-type reader. In that case, the card reader should be a wireless communication card-reader that wirelessly communicates with a non-contact type IC card. The non-contact-type card reader is an example of a communication device, and the non-contact-type IC card is an example of a wireless communication device. When a non-contact-type card reader is employed, tray 20 may not contain a through-hole or a notch. In that case, since data stored in the non-contact-type IC card is read by non-contact reading, at least the position in tray 20 that meets with the card reader should be formed of nonmetallic material such as resin through which radio waves pass. Further, in the lower face of tray 20 around the position that meets with the card reader, a mark showing the position of the non-contact-type card reader may be disposed.

Figure 10:
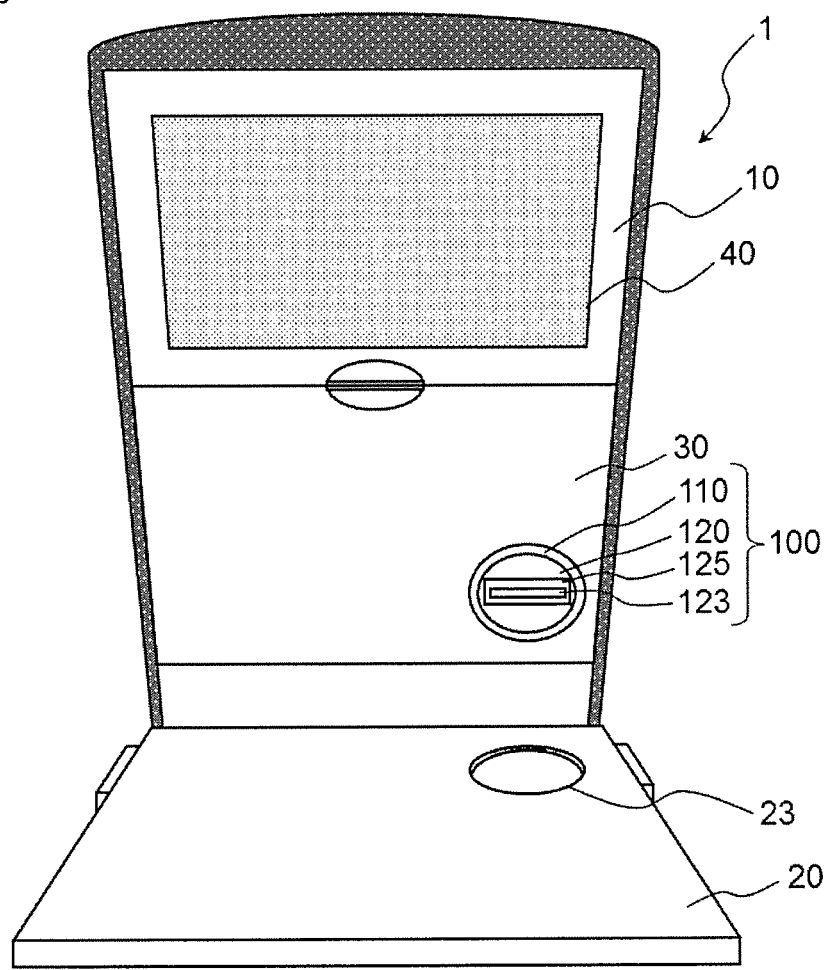
FIGS. 10 and 11 are schematic views of the seat with the tray opened in accordance with a further exemplary embodiment.
Figure 11:
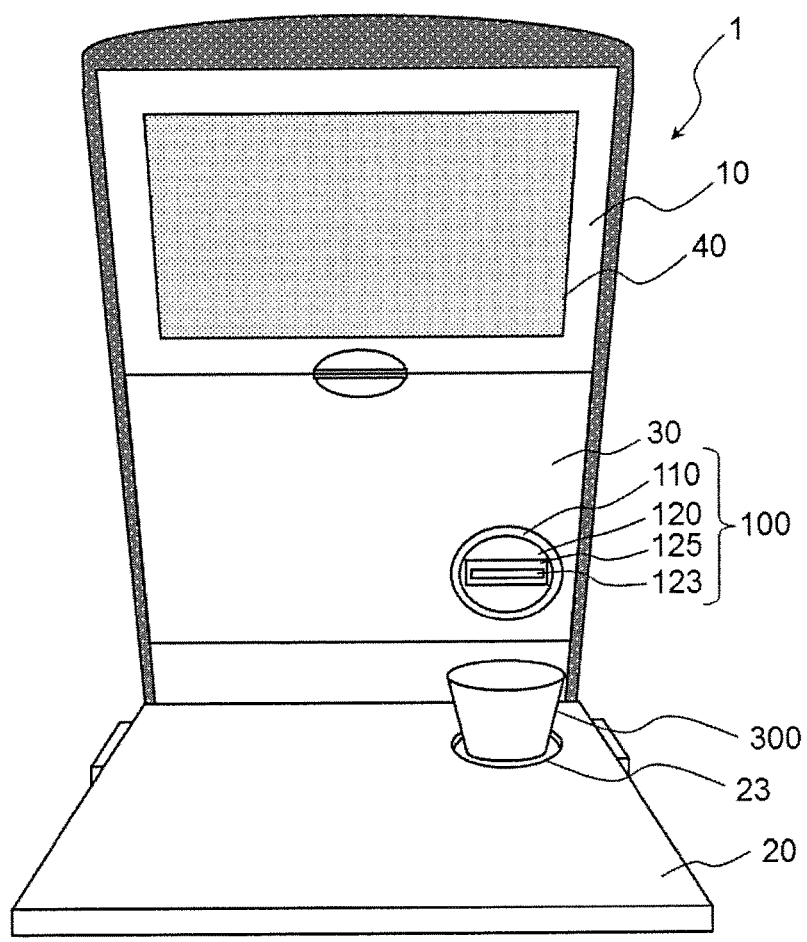

In that case, the position in tray 20 that meets with the card reader may be a thin-walled part 23, as illustratively shown in FIGS. 10 and 11. That is, mounting base 16 disposed on a position in base unit 10 that meets with the thin-walled part of tray 20 located in the storage position, and a payment terminal having a non-contact-type card reader may be mounted on mounting base 16. Such a thin-walled part enhances easy pass of radio waves, by which the non-contact-type card reader easily reads data stored in the card. In particular, when the thin-walled part 23 is formed as a recess in the upper face of tray 20, as illustratively shown in FIG. 10, the part 23 is also used for a stable space for a cup 300 when tray 20 is in the open state, as illustratively shown in FIG. 11. In the structure, too, the payment terminal having a non-contact-type card reader may contain a pop-up mechanism. The workings of the pop-up mechanism allow the part having the non-contact-type card reader of the payment terminal to go into the recess, by which the non-contact-type card reader gets close to the thin-walled part. This enhances stability in radio communication between the card reader and the non-contact-type IC card.

In the structure of the first exemplary embodiment, main unit 120 of payment terminal 100 is columnar, and cylindrical member 110 has a cylindrical shape; but, their shapes are not limited to, as long as they have workings described in the first exemplary embodiment.

In the first exemplary embodiment, the structure has rotatable member 130 so that main unit 120 interlocks with cylindrical member 110. That is, main unit 120 having card reader 125 moves in the X-minus direction with the movement in the X-plus direction of cylindrical member 110 pushed by tray 20. Instead of using rotatable member 130, a member having parallel movement can also offer interlocking movement between main unit 120 and cylindrical member 110. However, employing a member having rotational movement, like rotatable member 130 in the first exemplary embodiment, contributes to a downsized structure.

In the structure of the first exemplary embodiment, when tray 20 is moved to the storage position, exposed face 121 of main unit 120 moves to the sixth position at which it becomes nearly flush with the lower face of tray 20. With respect to tray 20 placed in the storage position, the sixth position may be located in the X-plus direction beyond the lower face of tray 20. In that case, when tray 20 is moved to the storage position, main unit 120 having card reader 125 is located at a position with a depth in the X-plus direction in through-hole 22. Compared to the structure in which card reader 125 is fixed at a position that is flush with the surface of storage section 30, card 50 can be easily inserted into the card slot.

In the structure of the first exemplary embodiment, payment terminal 100 having card reader 125 is an example of connection terminals. Such connection terminals often contain a USB (Universal Serial Bus) port and a headphone jack. In that case, too, connection devices, such as USB devices and headphones, can be easily connected, via through-hole 22, to the connection terminal mounted on storage section 30 of base unit 10. Further, when the main unit of the connection terminal is moved with the open/close movement of tray 20 by the pop-up mechanism described in the first exemplary embodiment, connection devices can be further easily connected to the connection terminal.

INDUSTRIAL APPLICABILITY

The present disclosure is applicable to a vehicle seat to offer effective use of a space on the rear side of the backrest. Specifically, the present disclosure is applicable to vehicle seats disposed in moving vehicles, such as airplanes, trains, and buses.

What is claimed is:

1. A vehicle seat comprising:
   a base unit that is disposed on a rear side of a backrest and has a storage section;
   a tray that has a through-hole or a notch through which a connection device of a predetermined size passes and is disposed so as to be movable between a storage position located in the storage section of the base unit and an open position of the tray unfolded from the storage position; and
   a connection terminal that is disposed on the base unit at a position that meets with the through-hole or the notch of the tray located at the storage position,
   wherein the connection terminal includes a movable part that moves between a first position and a second position different from the first position in response to the tray moving between the open position and the storage position.

2. The vehicle seat of claim 1, wherein the connection terminal is supported by the base unit via a mounting base.

3. The vehicle seat of claim 1, wherein the connection terminal has a card reader, and the connection device is a card that stores data readable by the card reader.

4. The vehicle seat of claim 1, wherein the connection terminal has a pop-up mechanism that makes a part of the connection terminal move relative to the base unit to go inside of the through-hole or the notch, with movement of the tray toward the storage position.

5. The vehicle seat of claim 1, wherein the connection terminal has an outer frame member and a connection-terminal main unit, and with movement of the outer frame member pushed by the tray, the connection-terminal main unit moves in a direction opposite to the outer frame member.

6. The vehicle seat of claim 5, wherein the connection terminal further has a rotatable member, the movement of the outer frame member allows the rotatable member to rotationally move with a predetermined angle, and the rotational movement of the rotatable member allows the connection-terminal main unit to move in a direction opposite to the outer frame member.

7. The vehicle seat of claim 1, wherein the through-hole or the notch retains a cup of a predetermined size on the tray located at the open position.

8. The vehicle seat of claim 1, wherein the connection terminal includes a slot that moves relative to the base unit between the first position and the second position.

9. A vehicle seat comprising:
   a base unit that is disposed on a rear side of a backrest and has a storage section;
   a tray that has a through-hole, a notch, or a thin-walled part formed of nonmetallic material and is disposed so as to be movable between a storage position located in the storage section of the base unit and an open position of the tray unfolded from the storage position; and
   a connection terminal that is disposed on the base unit at a position that meets with the through-hole, the notch, or the thin-walled part of the tray located at the storage position and communicates wirelessly with a wireless communication device,
   wherein the connection terminal includes a movable part that moves between a first position and a second position different from the first position in response to the tray moving between the open position and the storage position.

10. The vehicle seat of claim 9, wherein the connection terminal is supported by the base unit via a mounting base.

11. The vehicle seat of claim 9, wherein the connection terminal has a pop-up mechanism that makes a part of the connection terminal move relative to the base unit to go inside of the through-hole, the notch, or a recess formed by the thin-walled part, with movement of the tray toward the storage position.

12. The vehicle seat of claim 9, wherein the connection terminal includes a slot that moves relative to the base unit between the first position and the second position.

13. The vehicle seat of claim 9, wherein the through-hole, the notch, or the thin-walled part retains a cup of a predetermined size on the tray located at the open position.

14. The vehicle seat of claim 9, wherein the connection terminal has a card reader, and the connection device is a card that stores data readable by the card reader.

15. A vehicle seat comprising:
   a base unit that is disposed on a rear side of a backrest and has a storage section;
   a tray that has a through-hole or a notch through which a connection device of a predetermined size passes and is disposed so as to be movable between a storage position located in the storage section of the base unit and an open position of the tray unfolded from the storage position; and
   a connection terminal that is disposed on the base unit at a position that meets with the through-hole or the notch of the tray located at the storage position,
   wherein the connection terminal has an outer frame member and a connection-terminal main unit, and with movement of the outer frame member pushed by the tray, the connection-terminal main unit moves in a direction opposite to the outer frame member.

16. The vehicle seat of claim 15, wherein the connection terminal further has a rotatable member, the movement of the outer frame member allows the rotatable member to rotationally move with a predetermined angle, and the rotational movement of the rotatable member allows the connection-terminal main unit to move in a direction opposite to the outer frame member.

17. The vehicle seat of claim 15, wherein the connection terminal is supported by the base unit via a mounting base.

18. The vehicle seat of claim 15, wherein the connection terminal has a card reader, and the connection device is a card that stores data readable by the card reader.

19. The vehicle seat of claim 15, wherein the connection terminal has a pop-up mechanism that makes a part of the connection terminal move relative to the base unit to go inside of the through-hole or the notch, with movement of the tray toward the storage position.

20. The vehicle seat of claim 15, wherein the through-hole or the notch retains a cup of a predetermined size on the tray located at the open position.

* * * * *